Patented Feb. 19, 1952

2,586,606

UNITED STATES PATENT OFFICE 2,586,606

PROCESS FOR THE CONVERSION OF METAL SULFIDES

Alexander Bonnington, Huntington, W. Va.

No Drawing. Application June 11, 1948,
Serial No. 32,548

1 Claim. (Cl. 75—67)

The invention relates to a process for the conversion of metal sulphides soluble in water or acid into metal chlorides by treating such metal sulphides with sulphur chloride. This treatment results in the conversion of the sulphides into chlorides by quantitative reaction and causes precipitation of the sulphur element of both compounds as elementary precipitated sulphur as represented by the following equation:

$$S(metal) + S_2Cl_2 + H_2O = Cl_2(metal) + 3S + H_2O$$

The process is broadly applicable to the treatment of any metal sulphides soluble in water or acid with sulphur chloride to quantitatively produce metal chlorides and precipitated sulphur. So far as I am aware sulphur chloride has never been used in this manner and the process is believed to be broadly novel. My invention is accordingly intended to cover any process of producing metal chloride salts by the treatment of metal sulphides soluble in water or acid with sulphur chloride. The invention is particularly applicable to electrolytic processes for the treatment of metals such as zinc, magnesium, cadmium, strontium, or the like, which are soluble in acids such as hydrochloric, or in water, or even in certain gases such as sulphuretted hydrogen, in producing hydrochloric acid from chlorine gas.

The invention will, however, be particularly described with reference to the economical production of the metal magnesium, but it will be understood that the invention in its broadest aspects is not confined to this particular application of the broad concept involved.

Among the objects of the invention are the production of barium chlorides and precipitated sulphur produced by adding sulphur chloride to barium sulphide solution. Another feature of the invention is the production of magnesium chloride by indirect method accomplished by adding to a magnesium sulphide solution barium chloride produced from treating barium sulphide solution with sulphur chloride to produce insoluble barium sulphate and soluble magnesium chloride.

A further feature of the invention is the utilization of sulphur chloride on barium sulphide to produce barium chloride which may be employed for the conversion of magnesium sulphate to magnesium chloride.

Another application of the invention is in the treating of sulphuretted hydrogen, which may be produced by the carbonation of barium sulphohydrate, with sulphur chloride to produce hydrochloric acid and precipitated sulphur in water or acid solution.

Another feature of the invention is the production of magnesium chloride from magnesium ore with hydrochloric acid produced by treating sulphuretted hydrogen with sulphur chloride in water or acid solution.

Another application of the invention resides in the combination of processing magnesium sulphate with the process of producing barium chemicals to produce barium sulphate and magnesium chloride by treating barium sulphide, sulphohydrate, or sulphuretted hydrogen, which is a byproduct of barium, with sulphur chloride in water.

Another feature of the invention resides in the production of elementary sulphur from barium sulphide solution by treating such sulphide with sulphur chloride.

A further feature of the invention resides in the reaction of sulphur chloride on barium sulphide or sulphohydrate solution to permit the conversion of magnesium sulphate to magnesium chloride by adding such materials to barium chloride produced by treating barium sulphide or barium hydrate with sulphur chloride.

A specific application of the invention to the economical production of the metal magnesium will now be described.

By combining the process of treating dolomite or magnesite with sulphuric acid which produces magnesium sulphate, with the process of producing barium sulphates from baryta ore I produce magnesium chlorides in the following simple manner:

To an aqueous solution of barium sulphide I add sulphur chlorides which convert the barium sulphide to barium chloride an aqueous solution precipitating the sulphur element in both compounds as elementary precipitated sulphur.

$$BaSH\text{---}OH + S_2Cl_2 = BaCl_2 + 3S + H_2O$$

To the barium chloride solution so produced I add the magnesium sulphate solution from the dolomite or magnesium process. This converts the barium into the insoluble barium sulphate, and at the same time converts the magnesium sulphate into magnesium chloride.

$$BaCl_2 + MgSO_4 = BaSO_4 + MgCl_2$$

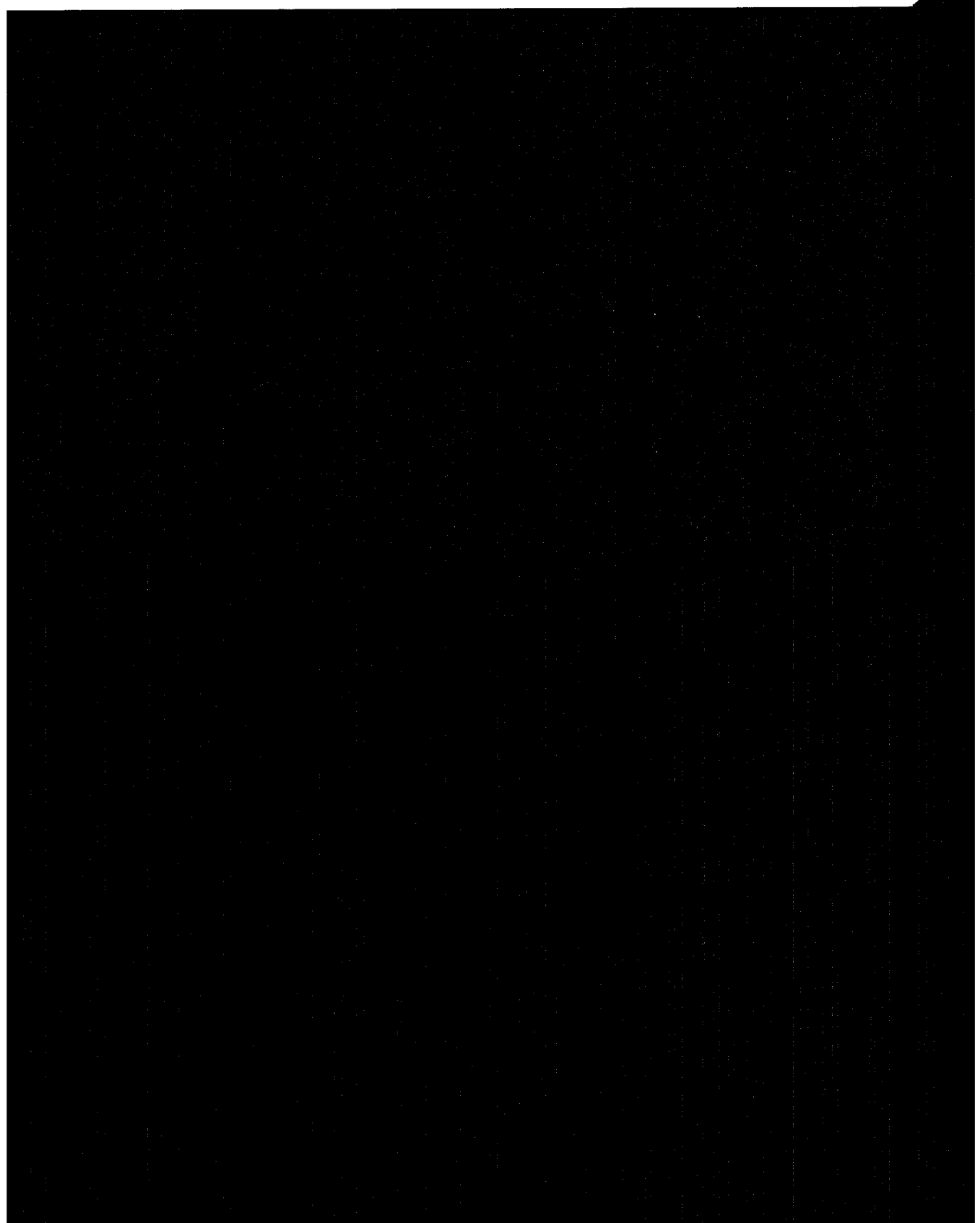

The magnesium chloride so produced requires only evaporation to dryness and electrolytic furnace treatment to produce the metal magnesium and free chlorine, the latter being absorbed in sulphur producing the necessary sulphur chloride in cycle operation to furnish the magnesium chlorides in the aforementioned manner.